United States Patent
Glover et al.

(10) Patent No.: US 10,467,269 B2
(45) Date of Patent: Nov. 5, 2019

(54) ACCESSING CATEGORY-SPECIFIC SEARCH SERVERS

(71) Applicant: Samsung Electronics Co., Ltd., Suwon-si, Gyeonggi-do (KR)

(72) Inventors: Eric J. Glover, Palo Alto, CA (US); Christopher Hoffman, San Luis Obispo, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 581 days.

(21) Appl. No.: 15/043,796

(22) Filed: Feb. 15, 2016

(65) Prior Publication Data

US 2016/0239557 A1 Aug. 18, 2016

Related U.S. Application Data

(60) Provisional application No. 62/116,210, filed on Feb. 13, 2015.

(51) Int. Cl.
*G06F 16/33* (2019.01)
*G06F 16/2458* (2019.01)

(52) U.S. Cl.
CPC ...... *G06F 16/3344* (2019.01); *G06F 16/2471* (2019.01)

(58) Field of Classification Search
CPC ......... G06F 17/30684; G06F 17/30864; G06F 17/30545; G06F 17/30985; G06F 16/3344; G06F 16/2471
See application file for complete search history.

(56) References Cited

U.S. PATENT DOCUMENTS

| | | | | |
|---|---|---|---|---|
| 8,429,147 | B1 * | 4/2013 | Dutton | G06F 17/30687 707/707 |
| 10,282,466 | B2 * | 5/2019 | Ben-Tzur | G06F 17/278 |
| 2005/0165753 | A1 * | 7/2005 | Chen | G06F 17/30867 |
| 2007/0050384 | A1 * | 3/2007 | Whang | G06F 17/30622 |

(Continued)

OTHER PUBLICATIONS

White, Michael. "Reining in CCG chart realization." In Natural Language Generation, pp. 182-191. Springer, Berlin, Heidelberg, 2004. (Year: 2004).*

*Primary Examiner* — Jesse P Frumkin
(74) *Attorney, Agent, or Firm* — Jefferson IP Law, LLP

(57) ABSTRACT

A search system includes a query processing device for processing a search query and a search server. The search server receives a search request with a search query and sends the search query to the query processing device via an application programming interface (API). Upon sending the search query to the query processing device, the search server determines whether an indication is received from the query processing device, the indication indicates that the search query does not trigger category-specific search results. In response to determining that the indication has not been received: the search server waits to receive the category-specific search results that correspond with the search query. The search server aggregates the category-specific search results with the general purpose search results, and transmits the aggregated search results. In response to determining that that indication has been received, the search server generates and transmits the general purpose search results.

23 Claims, 6 Drawing Sheets

(56) References Cited

U.S. PATENT DOCUMENTS

| | | | |
|---|---|---|---|
| 2010/0281012 A1* | 11/2010 | Imig | G06F 17/30864 |
| | | | 707/708 |
| 2014/0040224 A1* | 2/2014 | Grant | G06F 17/3087 |
| | | | 707/706 |
| 2015/0286643 A1* | 10/2015 | Kumar | G06F 17/30672 |
| | | | 707/728 |
| 2017/0177706 A1* | 6/2017 | Ben-Tzur | G06F 17/30601 |
| 2017/0193095 A1* | 7/2017 | Ben-Tzur | G06F 17/30696 |
| 2017/0193099 A1* | 7/2017 | Ben-Tzur | G06F 17/30637 |

* cited by examiner

ACCESSING CATEGORY-SPECIFIC SEARCH SERVERS

CROSS REFERENCE TO RELATED APPLICATIONS

This application claims priority under 35 U.S.C. § 119(e) to U.S. Provisional Application 62/116,210, filed on Feb. 13, 2015, which is hereby incorporated by reference in its entirety.

TECHNICAL FIELD

This disclosure relates to accessing category-specific search servers.

BACKGROUND

In recent years, the use of search servers has grown exponentially. Users may access search servers via mobile computing devices. For example, a mobile computing device may include a software application that displays a search box. The search box can accept a search query from a user. Upon receiving the search query from the user, the mobile computing device can transmit the search query to the search server. Soon after transmitting the search query, the mobile computing device may receive search results that correspond with the search query. The search results may include links to web pages. The mobile computing device can display the search results on a display of the mobile computing device. Upon detecting a user selection of a link to a web page, the mobile computing device can launch the web page in a web browser.

SUMMARY

The present disclosure provides a search system. The search system may include a query processing device for processing a search query and a search server. The search server may include a network communication device, a storage device, and a processing device. The storage device may store a search data store with one or more search records. The processing device may execute computer-readable instructions that, when executed by the processing device, cause the processing device to receive a search request via the network communication device. The search request may include a search query with one or more search terms. The search server can send the search query to the query processing device via an application programming interface (API).

Upon sending the search query to the query processing device, the search server may determine whether an indication is received from the query processing device. The indication may indicate that the search query does not trigger category-specific search results. In response to determining that the indication has not been received: the search server may receive the category-specific search results that correspond with the search query. The search server can generate general purpose search results for the search query based on the search records stored in the search data store. The search server can aggregate the category-specific search results and the general purpose search results. The search server can transmit the aggregated search results. In response to determining that that indication has been received, the search server can generate the general purpose search results for the search query based on the search records stored in the data store; and transmit the general purpose search results.

The query processing device may include a transceiver, a memory, and a computing processor. The memory may include a knowledge data store and grammar files. The knowledge data store may store a list of phrases and the phrase types associated with the phrases. The grammar files may store grammars. Each grammar may refer to one or more phrase types. Each grammar may be associated with one or more category-specific search servers. Each category-specific search server may be associated with a server identifier (ID). The computing processor may execute computer-readable instructions that, when executed by the computing processor, cause the computing processor to receive the search query via an application programming interface (API) request. The search query may include one or more search terms.

The query processing device may generate a chart parse for the search query based on the phrase types stored in the knowledge data store. The chart parse may identify the phrase types in the search query. The chart parse may also indicate the location of the phrase types within the search query. The query processing device may determine whether one or more grammars, from the grammar files, match the search query based on the phrase types included in the chart parse. In response to determining that none of the grammars match the search query, the query processing device can transmit an indication that there are no category-specific search results for the search query.

In response to determining that at least one of the grammars matches the search query, the query processing device can identify category-specific search servers that are associated with the matched grammars. The query processing device can retrieve, from the grammar files, the server IDs for the category-specific search servers that are associated with the matched grammars. The query processing device can generate the list of server IDs for the category-specific search servers that are associated with the matched grammars. The query processing device may transmit the list of server IDs via the transceiver.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
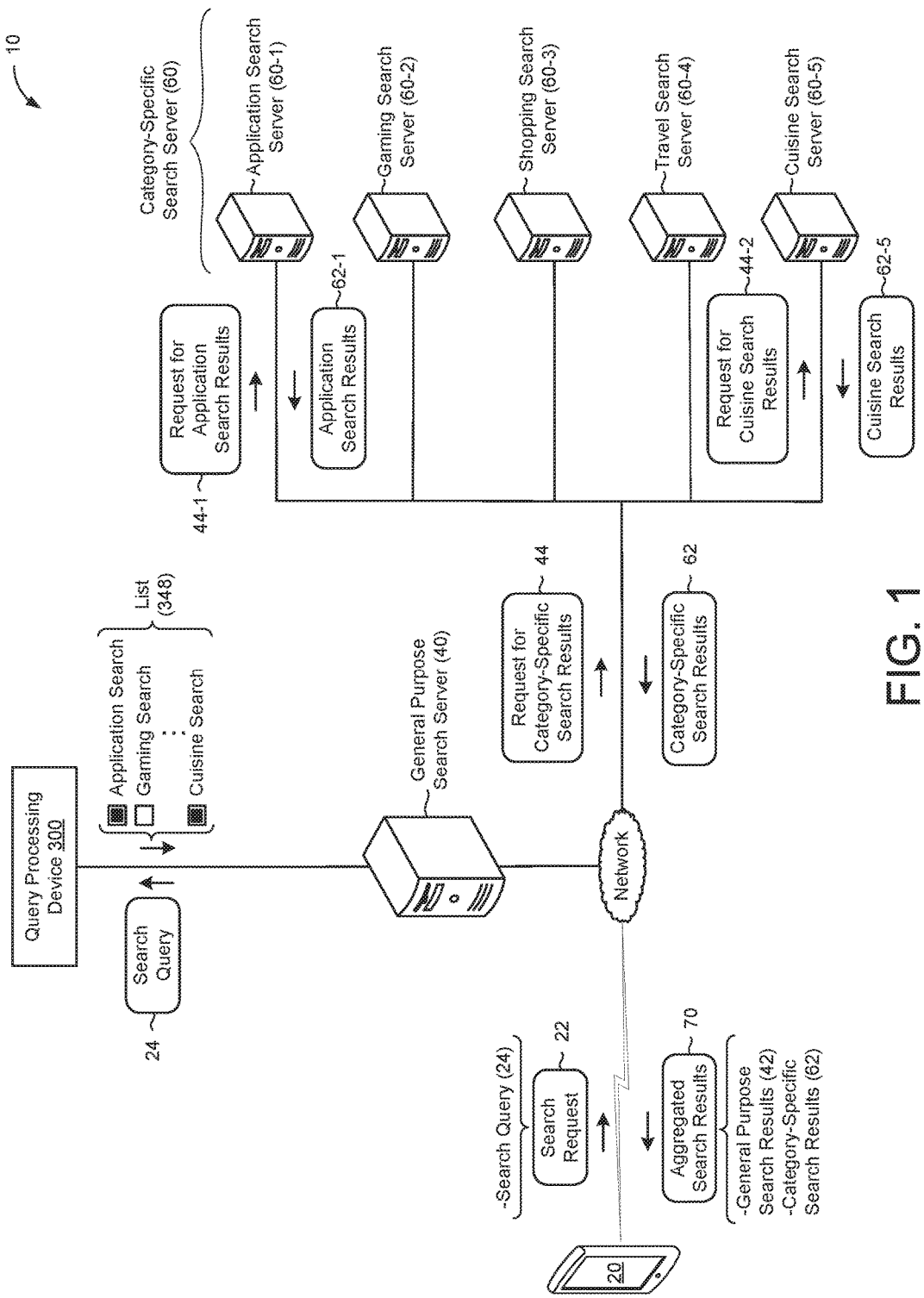
FIG. 1 is a schematic diagram of a search system.

Search servers provide search results in response to receiving a search query A search query and/or a search result may be associated with one or more categories. A category may refer to a particular class, a particular type, or a particular division of data. Example categories include applications, gaming, shopping, travel, cuisine, etc. A search result that is associated with the application category may include information regarding a software application. Similarly, a search result that is associated with the cuisine category may include information regarding a restaurant. In some scenarios, the categories may be referred to as verticals.

Some search servers provide search results that may be associated with various categories. Such search servers may be referred to as general purpose search servers, or general search servers. Search servers that provide search results for a specific category may be referred to as category-specific search servers, categorical search servers, or special purpose search servers. Examples of category-specific search servers include an application search server, a gaming search server, a shopping search server, a travel search server, a cuisine search server, etc.

The category-specific search servers provide search results that are related to their respective categories. For example, the application search server may provide search results that relate to software applications. The gaming search server may provide search results that relate to games. The shopping search server may provide search results that relate to retail products. The travel search server may provide search results that relate to flights, hotels and/or car rentals. The cuisine search server may provide search results that relate to food, and/or restaurants. Other category-specific search servers are also contemplated.

Since a category-specific search server may only provide search results that are associated with its respective category, the category-specific search server may return no search results upon receiving a search query that may be associated with a different category. For example, the application search server may not return any search results upon receiving a search query that is associated with the cuisine category. When a category-specific search server receives a search query that is not associated with its respective category, the category-specific search server expends valuable computing resources in processing a search query that likely yields no search results.

A query processing device, associated with the general purpose search server, can determine whether to send a search query to a category-specific search server. For example, the query processing device may determine whether to send a search query to the application search server, the gaming search server, the shopping search server, etc. The query processing device may be located proximate (e.g., adjacent) to the general purpose search server (e.g., in the same room, building, or city) to reduce communication latency. By contrast, the category-specific search servers may be located distant from the general purpose search server (e.g., in a different city, country, or continent).

The query processing device may determine to send a search query to a category-specific search server upon determining that the category-specific search server is likely to provide category-specific search results. If the query processing device determines that the category-specific search server is unlikely to provide category-specific search results, then the query processing device may determine not to send the search query to the category-specific search server. The query processing device may determine to send the search query to: a first category-specific search server, and not a second category-specific search server. For example, the query processing device may determine to send the search query to the application search server, and not to the travel search server.

Advantageously, the general purpose search server need not wait to receive category-specific search results from category-specific search servers to which the search query is not sent The general purpose search server may only wait to receive category-specific search results from those particular category-specific search servers to which the search query is sent. Additionally, the general purpose search server may receive an indication from the query processing device that the search query is unlikely to yield category-specific search results. Upon receiving the indication, the general purpose search server need not wait to receive category-specific search results. Hence, the overall time to provide search results to the mobile computing device may be reduced. Moreover, network congestion may be reduced by sending the search query to only the category-specific search servers that the query processing device identifies.

The general purpose search server, the query processing device, and the category-specific search server may be operated by different operators (e.g., different business entities, or companies). In some scenarios, an operator of a category-specific search server may charge a fee for each search query that the category-specific search server receives. In such scenarios, the fee may be avoided when the query processing device determines not to send a search query to the category-specific search server. In some scenarios, the operator of the category-specific search server may provide (e.g., furnish) the query processing device to the operator of the general purpose search server.

In some implementations, the query processing device may include a knowledge data store that indicates the information stored in the category-specific search server. For example, the knowledge data store may include an index that indexes the information stored in the category-specific search server. In such implementations, the knowledge data store may enable the query processing device to determine whether the category-specific search server can generate category-specific search results for a search query. For example, the knowledge data store may indicate whether the category-specific search server stores information that may be related to the search query. Advantageously, the query processing device can determine not to send a search query to the category-specific search server, if the knowledge data store indicates that the category-specific search server does not store any information that may be relevant to the search query. The knowledge data store may be updated periodically (e.g., every 24 hours).

FIG. 1 illustrates an example search system 10. The search system 10 may include a mobile computing device 20, a general purpose search server 40, one or more category-specific search servers 60, and a query processing device 300. The mobile computing device 20 allows a user of the mobile computing device 20 to enter a search query 24. Upon receiving the search query 24 from the user, the mobile computing device 20 can generate a search request 22, and transmit the search request 22 to the general purpose search server 40. The search request 22 includes the search query 24.

The general purpose search server 40 can provide general purpose search results 42 upon receiving the search request 22. The general purpose search results 42 may be associated with various categories of data. In other words, the general purpose search results 42 may not be restricted to a particular category. A category may refer to a type, a class, or a division of data. Example categories include applications, gaming, shopping, travel, cuisine, etc. The general purpose search results 42 may include links for web pages (e.g., web URLs).

The category-specific search servers 60 provide category-specific search results 62. The category-specific search results 62 generated by a particular category-specific search server 60 are related to the category associated with that particular category-specific search server 60. For example, the application search server 60-1 may provide application search results 62-1 that relate to software applications. The application search results 62-1 may include access mechanisms that provide access to respective software applications. The application search results 62-1 may include links for downloading software applications. Similarly, the gaming search server 60-2 may provide search results that relate to games. The shopping search server 60-3 may provide search results that relate to retail products. The travel search server 60-4 may provide search results that relate to flights, hotels and/or car rentals. The cuisine search server 60-5 may provide cuisine search results 62-5 that relate to food, and/or restaurants. Other category-specific search servers are also contemplated. In some scenarios, a category-specific search server 60 may be associated with multiple categories. In such scenarios, the category-specific search server 60 may be referred to as a multi-category search server. An example multi-category search server may be associated with the travel category, and the cuisine category.

In operation, the mobile computing device 20 sends a search request 22 to the general purpose search server 40. The search request 22 includes a search query 24. The general purpose search server 40 sends the search query 24 to the query processing device 300. The query processing device 300 processes the search query 22, and determines whether to request category-specific search results 62 from any of the category-specific search servers 60. If the query processing device 300 determines not to request category-specific search results 62 from the category-specific search server 60, the query processing device 300 can transmit an indication to the general purpose search server 40. The indication may indicate that the query processing device 300 has determined not to request category-specific search results 62 from the category-specific search servers 60. Hence, upon receiving the indication, the general purpose search server 40 need not wait to receive the category-specific search results 62. The indication may include a binary value (e.g., '1' for requesting category-specific search results 62, and '0' for not requesting category-specific search results 62).

The query processing device 300 can indicate to the general purpose search server 40 whether category-specific search results 62 are to be requested. Moreover, the query processing device 300 can identify particular category-specific search servers 60 from which the general purpose search server 40 can request category-specific search results 62. In some implementations, the query processing device 300 can indicate the particular category-specific search servers 60 to the general purpose search server 40 by sending a list 348 to the general purpose search server 40. The list 348 identifies the category-specific search servers 60 that the general purpose search server 40 can request category-specific search results 62 from. In the example of FIG. 1, the list 348 indicates that the general purpose search server 40 can request application search results 62-1 from the application search server 60-1, and cuisine search results 60-5 from the cuisine search server 60-5. In some examples, the list 348 may include server identifiers (IDs) for selected category-specific search servers 60. The server IDs may include IP addresses, MAC addresses, domain names, or the like.

The general purpose search server 40 can send a request 44 for category-specific search results 62 to the category-specific search servers 60 identified by the query processing device 300. For example, the general purpose search server 40 may send the request 44 to each category-specific search server 60 included in the list 348 that the general purpose search server 40 received from the query processing device 300. In the example of FIG. 1, the general purpose search server 40 sends a first request 44-1 to the application search server 60-1, and a second request 44-2 to the cuisine search server 60-5. Upon sending the request 44 for category-specific search results 62, the general purpose search server 40 receives category-specific search results 62 from the category-specific search server(s) 60. In the example of FIG. 1, the general purpose search server 40 receives application search results 62-1 from the application search server 60-1, and cuisine search results 60-5 from the cuisine search server 60-5.

The general purpose search server 40 can aggregate the general purpose search results 42, and the category-specific search results 62 to generate the aggregated search results 70. The category-specific search results 62 may include category-specific search results 62 that the general purpose search server 40 receives from different category-specific search servers 60. In the example of FIG. 1, the category-specific search results 62 include application search results 62-1 from the application search server 60-1, and the cuisine search results 62-5 from the cuisine search server 60-5. Generating the aggregated search results 70 may include determining the display order for the various general purpose search results 42 and the category-specific search results 62 that are within the aggregated search results 70. If the general purpose search server 40 receives an indication from the query processing device 300 that category-specific search results 62 are not being requested, then the general purpose search server 40 may generate and transmit the general purpose search results 42.

Figure 2:
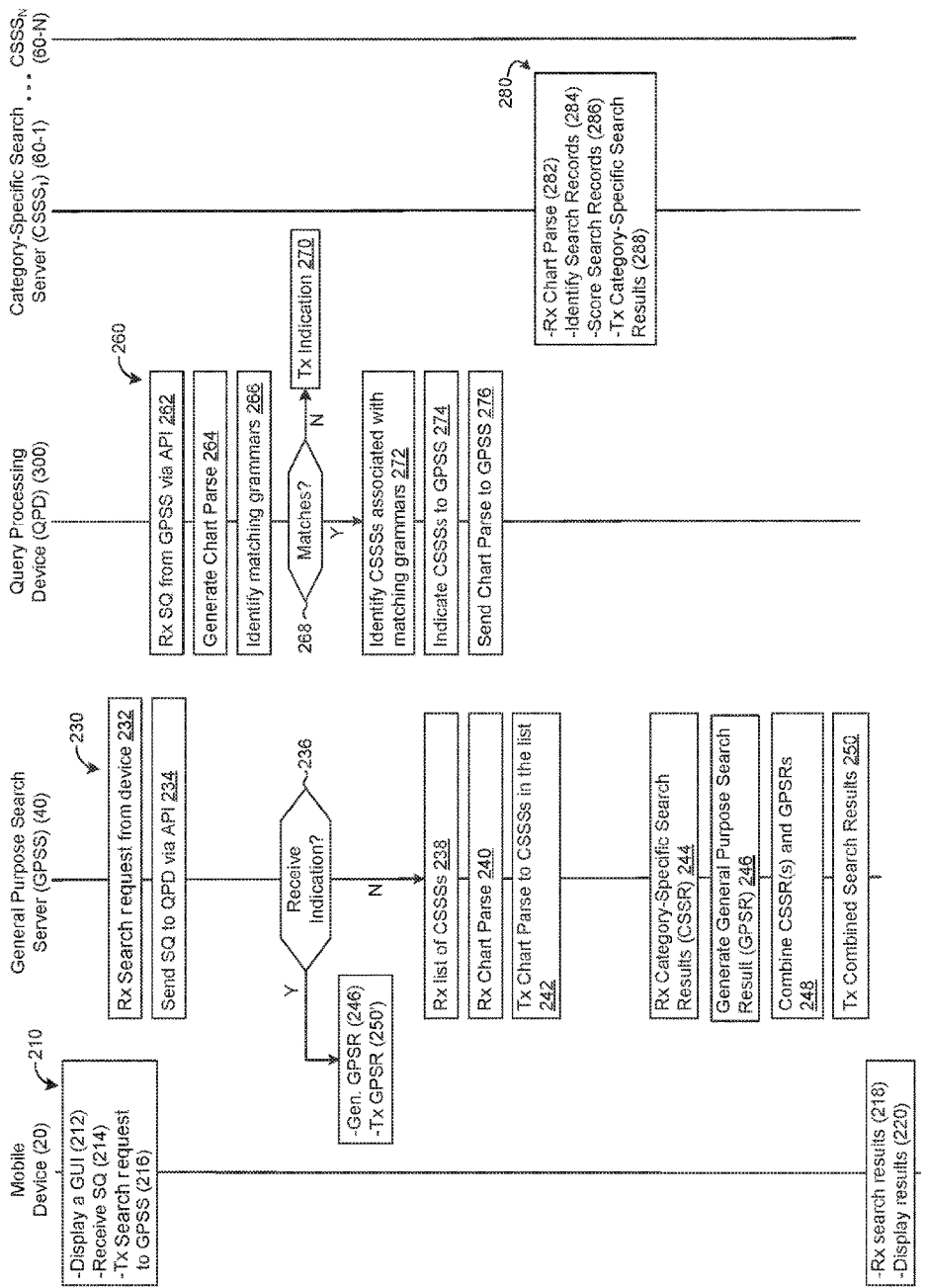
FIG. 2 is a diagram that illustrates example operations that the search system can perform.

FIG. 2 illustrates examples operations that the mobile computing device 20, the general purpose search server 40, the query processing device 300, and the category-specific search server(s) 60 may execute. The operations may be implemented as a set of computer-readable instructions that are executable by a processing device (e.g., a computing processor, for example, one or more CPUs). Specifically, the operations 210 may be executed by a computing processor (e.g., one or more Central Processing Units (CPUs)) of the mobile computing device 20. The operations 230 may be executed by a processing device (e.g., one or more computing processors) of the general purpose search server 40. The operations 260 may be executed by a computing processor of the query processing device 300. The operations 280 may be executed by a processing device of the category-specific search server 60.

Referring to 210, the mobile computing device 20 can display a graphical user interface (GUI) (at 212). The graphical user interface may include a search box that can accept a search query from the user. The graphical user interface may be a part of a software application (e.g., a search application), an application launcher program that launches software applications, or an operating system of the mobile computing device 20. At 214, the mobile computing device can receive a search query (SQ) from the user. Upon receiving the search query, the mobile computing device can generate a search request, and transmit (Tx) the search request to the general purpose search server (GPSS) (at 216). The search request may include the search query, and other contextual data (e.g., a device location, etc.). In response to transmitting the search request, the mobile computing device receives (Rx) search results (at 218). The search results may include general purpose search results that are generated by the general purpose search server, and category-specific search results that are generated by one or more category-specific search servers. The mobile computing device can display the received search results on a display (at 220).

Referring to 230, the general purpose search server 40 receives (Rx) the search request from the mobile computing device (at 232). The general purpose search server can send the search query (SQ) to the query processing device (QPD) (at 234). The general purpose search server may send the search query to the query processing device via an application programming interface (API). In some examples, the API may include a RESTful API, and the general purpose search server may utilize a POST or GET command to send the search query to the query processing device. The API may respond in two stages. In the first stage, the API may return a binary value that indicates whether the search query is to be sent to a category-specific search server. For example, a binary value of '1' may indicate that the search query is to be sent to one or more category-specific search servers. In this example, a binary value of '0' may indicate that the search query is not to be sent to the category-specific search server(s). In the second stage, the API may return a list of category-specific search servers to which the search query may be sent. Additionally or alternatively, in the second stage, the API may return the category-specific search results. An API that responds in two stages may be referred to as a two-staged API.

At 236, the general purpose search server determines whether the general purpose search server has received, from the query processing device, an indication that the search query is not being sent to the category-specific search server. Receiving the indication that the search query is not being sent to the category-specific search server may include receiving a binary value of '0'. By contrast, receiving an indication that the search query is being sent to the category-specific search server may include receiving a binary value of '1'. If the general purpose search server does not receive an indication of the search query not being sent to the category-specific search server, then the general purpose search server may determine that the search query is being sent to the category-specific search server(s). Hence, the general purpose search server may wait to receive the category-specific search results. Put another way, if the general purpose search server receives an indication that the search query is being sent to the category-specific search server, then the general purpose search server may wait to receive the category-specific search results.

In response to sending the search query to the query processing device, the general purpose search server can receive (Rx) a list of category-specific search servers (CSSS) from the query processing device (at 238). In some implementations, the general purpose search server 40 may also receive (Rx) a chart parse from the query processing device (at 240). The chart parse may identify the types of phrases that are in the search query. In such implementations, the general purpose search server 40 can transmit (Tx) the chart parse to the category-specific search servers (CSSS) identified in the list (at 242). Alternatively, the general purpose search server can send the search query to the category-specific search servers identified in the list. In some implementations, the general purpose search server may not perform the operations 238-242. In such implementations, the query processing device may send the search query and/or the chart parse directly to the category-specific search server(s).

At 244, the general purpose search server may receive (Rx) category-specific search results from the category-specific search servers to which the general purpose search server or the query processing device transmitted the chart parse or the search query. In some implementations, instead of receiving category-specific search results, the general purpose search server may receive an indication that there are no category-specific search results. The general purpose search server may wait for a predetermined amount of time to receive the category-specific search results from a category-specific search server. After waiting for the predetermined amount of time, the general purpose search server may determine that the category-specific search server has not found any category-specific search results. The predetermined amount of time may be different for different category-specific search servers.

In some implementations, the general purpose search server may generate general purpose search results (GPSR) (at 246). The general purpose search server may include a data store that stores search records. The general purpose search server may identify search records that may be relevant to the search query, and retrieve data from the identified search records to generate the general purpose search results. The general purpose search results may include links to web pages.

At 248, the general purpose search server aggregates (e.g., combines) the category-specific search results (CSSR) that the general purpose search server may have received from different category-specific search servers. If the general purpose search server generated general purpose search results (GPSR), then the general purpose search server can combine the general purpose search results with the category-specific search results. Aggregating the general purpose search results and the category-specific search results may include determining a display order for each search result based on the relevance of the search result to the search query. At 250, the general purpose search server transmits (Tx) the aggregated search results to the mobile computing device.

Referring back to 236, if the general purpose search server receives an indication that the search query is not to be transmitted to the category-specific search server(s), then the general purpose search server may not wait to receive the category-specific search results. Instead, the general purpose search server can generate the general purpose search results (at 246), and transmit (Tx) the general purpose search results (GPSR) to the mobile computing device (at 250').

Referring to 260, the query processing device receives (Rx) the search query from the general purpose search server (at 262). The query processing device may receive the search query via an API (e.g., via a POST request). The query processing device may respond to the API request in two stages. In the first stage, the query processing device can transmit an indication that indicates whether the search query is to be sent to the category-specific search server(s). In the second stage, the query processing device can transmit a list of category-specific search servers to which the search query may be sent. Alternatively, in the second stage, the query processing device may transmit the category-specific search results (e.g., if the query processing device requests the category-specific search results from the category-specific search servers).

Figure 3:
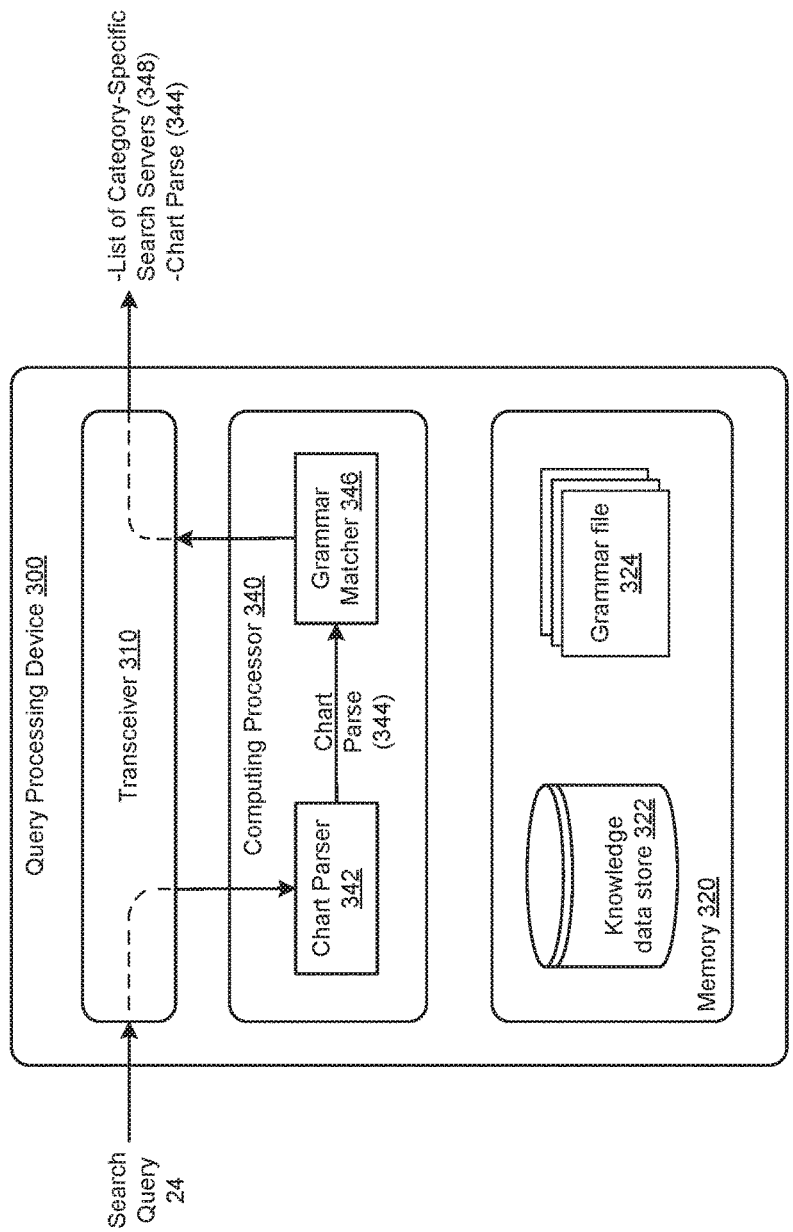
FIG. 3 is a block diagram of an example query processing device.

At 264, the query processing device generates a chart parse for the search query. The chart parse may identify phrases, and the types of phrases ("phrase type", hereinafter) that are in the search query. A phrase may refer to a collection of words. In some scenarios, a phrase may include a single word. The chart parse can also indicate the relative position of each phrase type within the search query. FIGS. 3 and 4B illustrate example techniques for generating the chart parse.

At 266, the query processing device identifies grammars that match the search query. A grammar may define a set of phrase types. A grammar matches the search query, if the search query includes the phrase types defined by the grammar, and the phrase types span the entire search query. The query processing device may include a grammar data store that stores all the grammars. The query processing device can identify matching grammars by querying the grammar data store with the sets of phrase types that span the entire search query. FIGS. 3 and 4C illustrate example techniques for identifying matching grammars.

At 268, the query processing device determines whether the search query matches any of the stored grammars. If the query processing device determines that the search query does not match any of the stored grammars, then the query processing device can determine not to request category-specific search results from the category-specific search servers. If the search query does not match any of the grammars, the query processing device can send (Tx) an indication to the general purpose search server (at 270). The indication can indicate that the search query does not match any of the grammars. The indication may indicate that the search query is not being transmitted to any of the category-specific search servers.

At 272, the query processing device identifies category-specific search servers based on the matching grammars. A grammar may be associated with one or more category-specific search servers. Upon identifying a matching grammar, the query processing device can retrieve the server IDs for category-specific search servers that are associated with the matching grammar. The query processing device can generate a list of the category-specific search servers that are associated with the matching grammars.

At 274, the query processing device indicates the category-specific search servers that the query processing device identified to the general purpose search server. The query processing device can indicate the category-specific search servers to the general purpose search server by sending the list of the category-specific search servers to the general purpose search server. The list may include server IDs for the category-specific search servers. The server IDs may include IP addresses, MAC addresses, or domain names for the category-specific search servers. The query processing device may also send the chart parse to the general purpose search server (at 276).

Referring to 280, the category-specific search server may receive (Rx) a chart parse (at 282). The category-specific search server may receive the chart parse from the general purpose search server, or the query processing device. Alternatively, the category-specific search server may receive the search query instead of the chart parse. The category-specific search server may include a data store that stores various search records. The search records may correspond with items that are in the category associated with the category-specific search server. For example, if the category-specific search server is an application search server, then the search records may correspond with software applications.

At 284, the category-specific search server identifies search records that may be relevant to the search query. The category-specific search server may query the data store with the terms of the search query to identify the relevant search records. Upon identifying the relevant search records, the category-specific search server can score the search records (at 286). The category-specific search server may generate a feature vector for each search record, and input the feature vector into a machine-learned scoring model. The machine-learned scoring model may generate a relevance score for the search record based on the feature vector.

At 288, the category-specific search server can generate the category-specific search results, and transmit (Tx) the category-specific search results. Generating the category-specific search results may include retrieving data from the search records that the category-specific search server identified as being relevant. In some implementations, the category-specific search server may retrieve data from search records that received a relevance score greater than a threshold. The category-specific search results may include access mechanisms for applications. The access mechanisms may include a link to download the application. The access mechanisms may also provide direct access to a particular state of an application.

FIG. 3 illustrates an example implementation for the query processing device 300. The query processing device 300 may include a transceiver 310, a memory 320, and a computing processor 340. The query processing device 300 may be implemented by a cloud computing platform. The cloud computing platform may include a collection of remote computing services. The cloud computing platform may include computing resources (e.g., the computing processor 340). The computing resources may include physical central processing units (pCPUs). The cloud computing resources may include storage resources (e.g., the memory 320). The storage resources may include database servers that support NoSQL, My SQL, Oracle, SQL Server, or the like. The cloud computing platform may include networking resources (e.g., the transceiver 310). Example cloud computing platforms include Amazon Web Services®, Google Cloud Platform®, Microsoft AZURE™ and Alibaba Aliyun™.

The transceiver 310 may operate in accordance with an Institute of Electrical and Electronics Engineers (IEEE) specification (e.g., IEEE 802.3 or IEEE 802.11). The transceiver 310 may operate in accordance with a 3rd Generation Partnership Project (3GPP) specification (e.g., Code Division Multiple Access (CDMA), Long Term Evolution (LTE), or LTE-Advanced). The transceiver 310 may operate in accordance with a Universal Serial Bus (USB) specification (e.g., via a USB port). The transceiver 310 may operate in accordance with other communication protocols.

The memory 320 may include one or more computer readable storage mediums. For example, the memory 320 may include solid state memory devices, hard disk memory devices, optical disk drives, read-only memory, and/or nanotube-based storage devices. The memory 320 may be connected to the computing processor 340 via a bus, and/or a network. Different storage mediums of the memory 320 may be located at the same physical location (e.g., in the same data center, same rack, or same housing). Alternatively, different storage mediums of the memory 320 may be distributed (e.g., in different data centers, different racks, or different housings). The memory 320 may store a knowledge data store 322, and various grammar files 324.

The knowledge data store 322 may store a list of phrases along with the phrase types for the phrases. The query processing device 300 can utilize the knowledge data store 322 to generate the chart parse 344. The phrase types may include entity types, intent words, and/or modifier words. An entity type may refer to a category of physical or logical objects. Example entity types may include application, movie, actor, etc. An intent word may refer to a keyword that is associated with a particular entity type. For example, "watch" is an intent word that is associated with the 'movie' entity type. Similarly, "download" is an intent word that is associated with the 'application' entity type. A modifier word may refer to a subset of entities. For example, "free" may refer to applications that are free. Similarly, "old" may refer to movies that were released more than 20 years ago. The knowledge data store 322 may include one or more databases, indices (e.g., inverted indices), tables (e.g., lookup tables), files, or other data structures.

The knowledge data store 322 may indicate the information stored in the category-specific search server(s). For example, the list of phrases in the knowledge data store 322 may correspond with respective records stored in the category-specific search server. The knowledge data store 322 may enable the query processing device 300 to determine whether the category-specific search server can generate category-specific search results for a search query. The query processing device 300 may receive the list of phrases from the category-specific search server(s). Upon receiving the phrases from the category-specific search server(s), the query processing device 300 can write the phrases into the knowledge data store 322. The query processing device 300 may update the knowledge data store 22 periodically (e.g., every 24 hours) by requesting the category-specific search servers for phrases associated with any new records.

The grammar files 324 may be stored in a grammar data store (not shown). A grammar file 324 may store a grammar. A grammar may include a set of phrase types. A grammar may also specify the order of the phrase types that are in the grammar. A search query that includes all the phrase types that are in the grammar satisfies the grammar. Moreover, if the phrase types defined by a grammar do not span the entire search query, then the search query may not satisfy the grammar. In other words, a search query matches a grammar if the phrase types in the grammar account for all the search terms in the search query. A grammar may be associated with one or more category-specific search servers. For example, the following grammars may be associated with the application search server:

[application_name]
[download] [application_name]
[download] [application_name] [free]
[application_name] [reviews]

Some grammars may include operators. An operator may indicate a required component of a grammar, or an an optional component of a grammar. A "?" operator may indicate that the component is optional. For example, [application_name] [modifier_word]? may indicate that the modifier word is optional. A "+" operator may indicate that the component is required, and that multiple instances of the component may be present. For example, [application_name] [modifier_word]+ may indicate that at least one modifier word is required.

The computing processor 340 may execute computer-readable instructions that, when executed by the computing processor 340, cause the computing processor 340 to implement a chart parser 342 and a grammar matcher 346. The chart parser 342 generates the chart parse 344 based on the search query 24. The chart parse 344 indicates the phrase types that are in the search query 24. The chart parse 344 also indicates the locations of the phrase types within the search query 24. The locations of the phrase types may include a start token position, and an end token position. The chart parser 342 may utilize a variety of techniques to generate the chart parse 344.

The chart parser 342 can tokenize the search query 24 by splitting the search query 24 by a given delimiter (e.g., " "). Upon tokenizing the search query 24, the chart parser 342 can generate n-grams by combining adjacent tokens. The chart parser 342 can determine the phrase types associated with the n-grams by querying the knowledge data store 322 with the n-grams. Upon querying the knowledge data store 322, the chart parser 322 may receive the phrase types associated with some of the n-grams. After receiving the phrase types, the chart parser 322 can generate the chart parse 344. Table 1 illustrates an example visual representation of a chart parse 344 for a search query 24 with five tokens:

TABLE 1

| Visual representation of a chart parse for a search query with five tokens | | | | |
|---|---|---|---|---|
| Token 1 | Token 2 | Token 3 | Token 4 | Token 5 |
| Phrase Type 1 | | | | |
| Phrase Type 2 | | | | |
| Phrase Type 3 | | | | |
| | Phrase Type 4 | | | |
| | Phrase Type 5 | | | |
| | | Phrase Type 6 | | |
| | | Phrase Type 7 | | |
| | | | Phrase Type 8 | |
| | | | | Phrase Type 9 |

The chart parser 342 may represent the chart parse 344 as a mapping that maps a token start position and a token end position to the phrase type that corresponds with the tokens ranging from the token start position to the token end position. Table 2 illustrates an example chart parse 344.

TABLE 2

| Example Chart Parse | |
|---|---|
| (Token Start Position, Token End Position) | Phrase Type |
| (1, 1) | Phrase Type 1 |
| (1, 2) | Phrase Type 2 |
| (1, 3) | Phrase Type 3 |
| (2, 3) | Phrase Type 4 |
| (2, 4) | Phrase Type 5 |
| (3, 4) | Phrase Type 6 |
| (3, 5) | Phrase Type 7 |
| (4, 5) | Phrase Type 8 |
| (5, 5) | Phrase Type 9 |

In some implementations, the chart parser 342 may transform the chart parse 344 into a mapping that maps a phrase type and a token start position to a token end position. Such a transformation may result in a data structure that may be referred to as an augmented inverse chart parse. Table 3 illustrates an example augmented inverse chart parse.

TABLE 3

Example augmented inverse chart parse

| Phrase Type, Token Start Position | Token End Position |
|---|---|
| Phrase Type 1, 1 | 1 |
| Phrase Type 2, 1 | 2 |
| Phrase Type 3, 1 | 3 |
| Phrase Type 4, 2 | 3 |
| Phrase Type 5, 2 | 4 |
| Phrase Type 6, 3 | 4 |
| Phrase Type 7, 3 | 5 |
| Phrase Type 8, 4 | 5 |
| Phrase Type 9, 5 | 5 |

The grammar matcher 346 identifies grammars that match the search query 24. The grammar matcher 346 can utilize the chart parse 344 to identify the matching grammars. The grammar matcher 346 can determine that a grammar matches the search query 24, if the phrase types defined by the grammar span the entire chart parse 344. To identifying a matching grammar, the grammar matcher 346 can query the grammar files 324 with a set of phrase types that span the entire chart parse 344. Table 4 illustrates sets of phrase types that span the entire chart parse 344 shown in Table 1.

TABLE 4

Sets of Phrase Types that span the entire chart parse

| Set # | Phrase Types |
|---|---|
| Set # 1 | [Phrase Type 1] [Phrase Type 4] [Phrase Type 8] |
| Set # 2 | [Phrase Type 1] [Phrase Type 5] [Phrase Type 9] |
| Set # 3 | [Phrase Type 2] [Phrase Type 6] [Phrase Type 9] |
| Set # 4 | [Phrase Type 2] [Phrase Type 7] |
| Set # 5 | [Phrase Type 3] [Phrase Type 8] |

The grammar matcher 346 can query the grammar files 324 with each set of phrase types. If the grammar files 324 store a particular grammar that includes all phrase types in a set, then the grammar matcher 346 can determine that the particular grammar matches the search query 24. Upon identifying all the grammars that match the search query 24, the grammar matcher 324 can identify the category-specific search servers 60 that are associated with the matching grammars. The grammar matcher 324 may retrieve server IDs for the category-specific search servers that are associated with the grammars that match the search query 24.

The query processing device 300 can generate a list 348 of category-specific search servers 60 that are associated with the matching grammars. The list 348 may include the server IDs for the category-specific search servers 60. The query processing device 300 may transmit the list 348 to the general purpose search server 40. Additionally, the query processing device 300 may transmit the chart parse 344 to the general purpose search server 40.

Figure 4A:
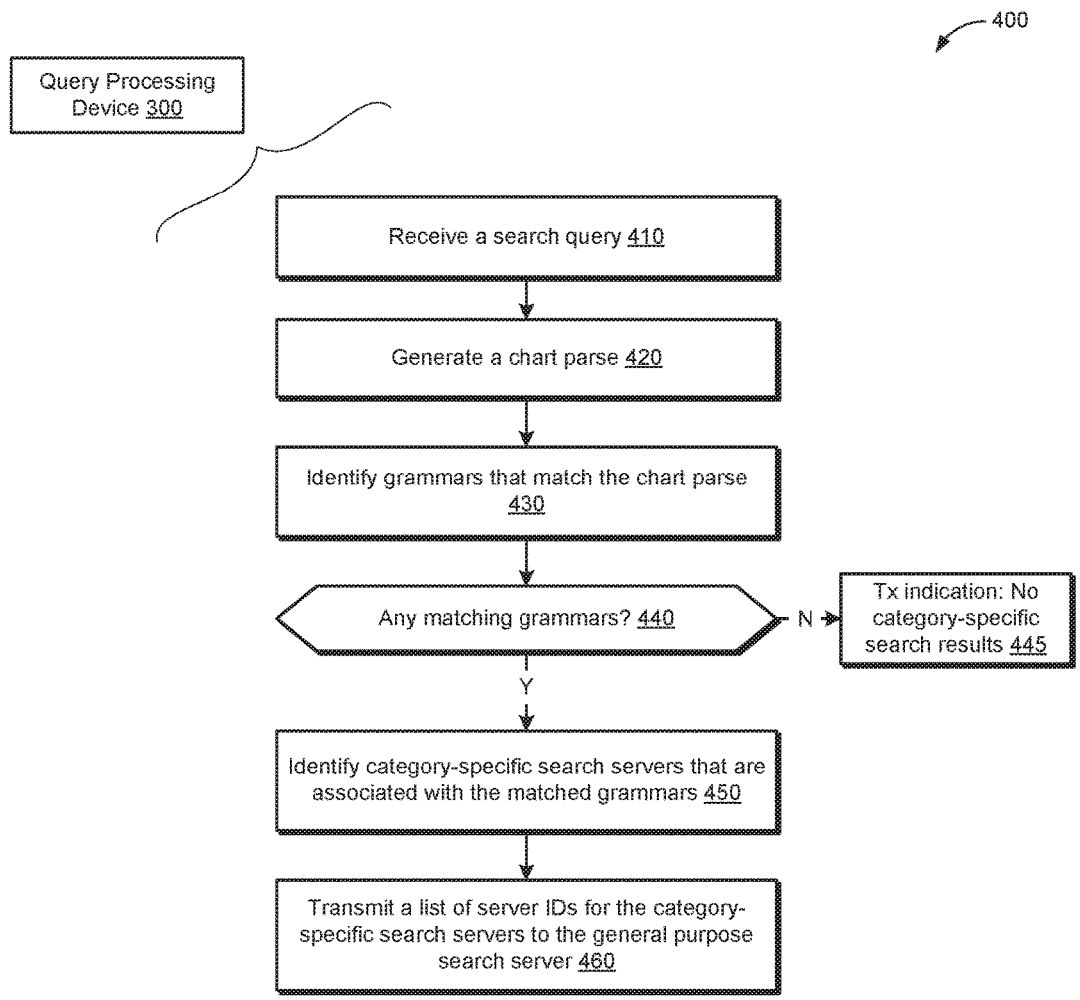
FIGS. 4A-C are block diagrams that illustrate examples operations that the query processing device can perform.
Figure 4B:
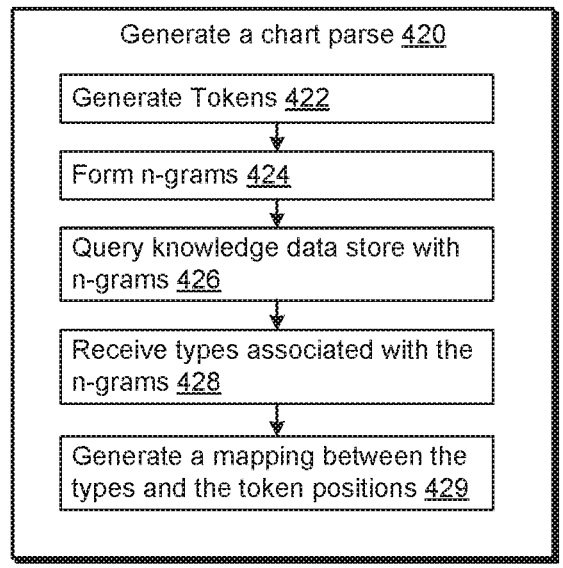
Figure 4C:
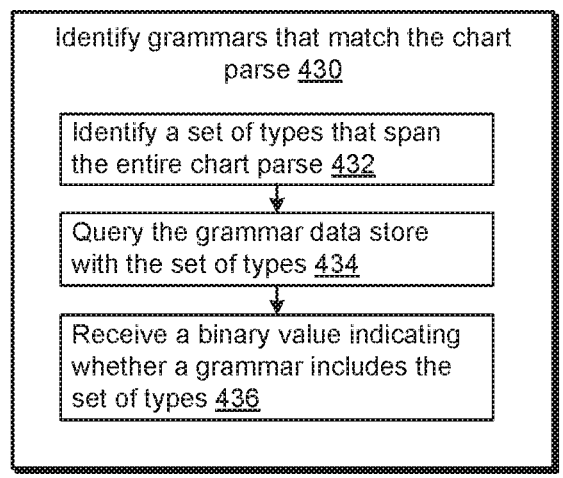

FIG. 4A-C illustrate examples operations 400 that the query processing device 300 may perform. The operations 400 may be implemented as a set of computer-readable instructions that can be executed by the computing processor 340 of the query processing device 300. At 410, the query processing device 300 receives a search query. The query processing device 300 may receive the search query from the general purpose search server. Alternatively, the query processing device 300 may receive the search query from the mobile computing device. Receiving the search query may include receiving a search request that includes the search query along with additional information such as a device location, etc.

At 420, the query processing device 300 generates a chart parse. The query processing device 300 may generate the chart parse based on techniques described in relation to FIG. 3. In some implementations, the query processing device 300 may utilize a conventional parser to generate the chart parse (e.g., the Earley parser, or the like). The chart parse identifies the phrase types in the search query. The chart parse may also indicate the start token position and the end token position for each phrase type. In some implementations, generating the chart parse may include generating the augmented inverse chart parse (e.g., as discussed in relation to FIG. 3). See FIG. 4A for an example set of operations that the query processing device 300 may perform to generate the chart parse.

At 430, the query processing device 300 identifies grammars that match the search query. The query processing device 300 may utilize the chart parse to identify the matching grammars. The query processing device 300 may include a grammar data store (e.g., grammar files) that stores various grammars. The query processing device 300 can query the grammar data store with the phrase types indicated by the chart parse to identify grammars that match the search query. For example, the query processing device 300 may query the grammar data store with a set of phrase types that span the entire search query. In response to such a query, the query processing device 300 may receive an indication as to whether the grammar data store includes a grammar that is defined by the set of phrase types.

At 440, the query processing device 300 determines whether the search query matched any of the stored grammars. If the search query satisfied at least one grammar, then the method 400 proceeds to 450, else the method 400 proceeds to 445. At 445, the query processing device 300 transmits an indication that there may be no category-specific search results for the search query. Transmitting the indication may include transmitting a binary value of '0' to indicate that the search query is not to be sent to a category-specific search server. The query processing device 300 transmits the indication so that the general purpose search server need not wait to receive category-specific search results from the category-specific search server(s).

At 450, the query processing device 300 identifies category-specific search servers that are associated with the matched grammars. The grammars may be associated with one or more category-specific search servers. The query processing device 300 can retrieve, from the grammar data store, the server IDs for the category-specific search servers that are associated with the matched grammars. Retrieving the server IDs may include retrieving the IP addresses, the MAC addresses, and/or the domain names for the category-specific search servers that are associated with the matched grammars.

At 460, the query processing device 300 generates and transmits a list of server IDs for the category-specific search servers that are associated with the matched grammars. Generating the list may include instantiating a data container (e.g., a JSON object, an XML tile, etc.), and writing the server IDs for the category-specific search servers to the data container. The query processing device 300 transmits the list of server IDs to the general purpose search server. The query processing device 300 can also transmit the chart parse to the general purpose search server.

FIG. 4B illustrates an example set of operations that the query processing device 300 may execute to generate the chart parse. At 422, the query processing device 300 can generate tokens by splitting the search query with a given delimiter (e.g., " "). At 424, the query processing device 300 can utilize the tokens to generate n-grams. The query processing device 300 may form the n-grams by combining (e.g., concatenating) adjacent tokens. At 426, the query processing device 300 can query the knowledge data store with the n-grams to determine the phrase types associated with the n-grams. Querying the knowledge data store may include querying an inverted index that indexes phrases to their respective phrase types. At 428, the query processing device 300 receives the phrase types associated with n-grams that are stored in the knowledge data store.

At 429, the query processing device 300 generates a mapping between the phrase types and the token positions. In some implementations, the mapping maps start token positions and end token positions to the phrase types that span the token range defined by the start token position and the end token position. In such implementations, the mapping may be referred to as a chart parse. In some implementations, the mapping can map the phrase types and their start token positions to their respective end token positions. In such implementations, the mapping may be referred to as an augmented inverse chart parse.

FIG. 4C illustrates an example set of operations that the query processing device 300 may execute to identify grammars that match the search query. At 432, the query processing device 300 may identify a set of phrase types that span the entire chart parse. Put another way, the query processing device 300 may identify a set of phrase types, from the chart parse, that collectively reference all search terms of the search query. At 434, the query processing device 300 can query the grammar data store (e.g., the grammar files) with the set of phrase types. Querying the grammar data store may include querying an index (e.g., inverted index) that maps sets of phrase types to the grammars that include the phrase types. At 436, the query processing device may receive a binary value indicating whether a grammar includes the set of phrase types. If a grammar includes the set of phrase types, then the query processing device may receive a binary value of '1'. Upon receiving a binary value of '1', the query processing device may determine that the set of phrase types match a stored grammar. Moreover, the query processing device may receive server IDs for category-specific search servers that are associated with the matching grammar.

Figure 5:
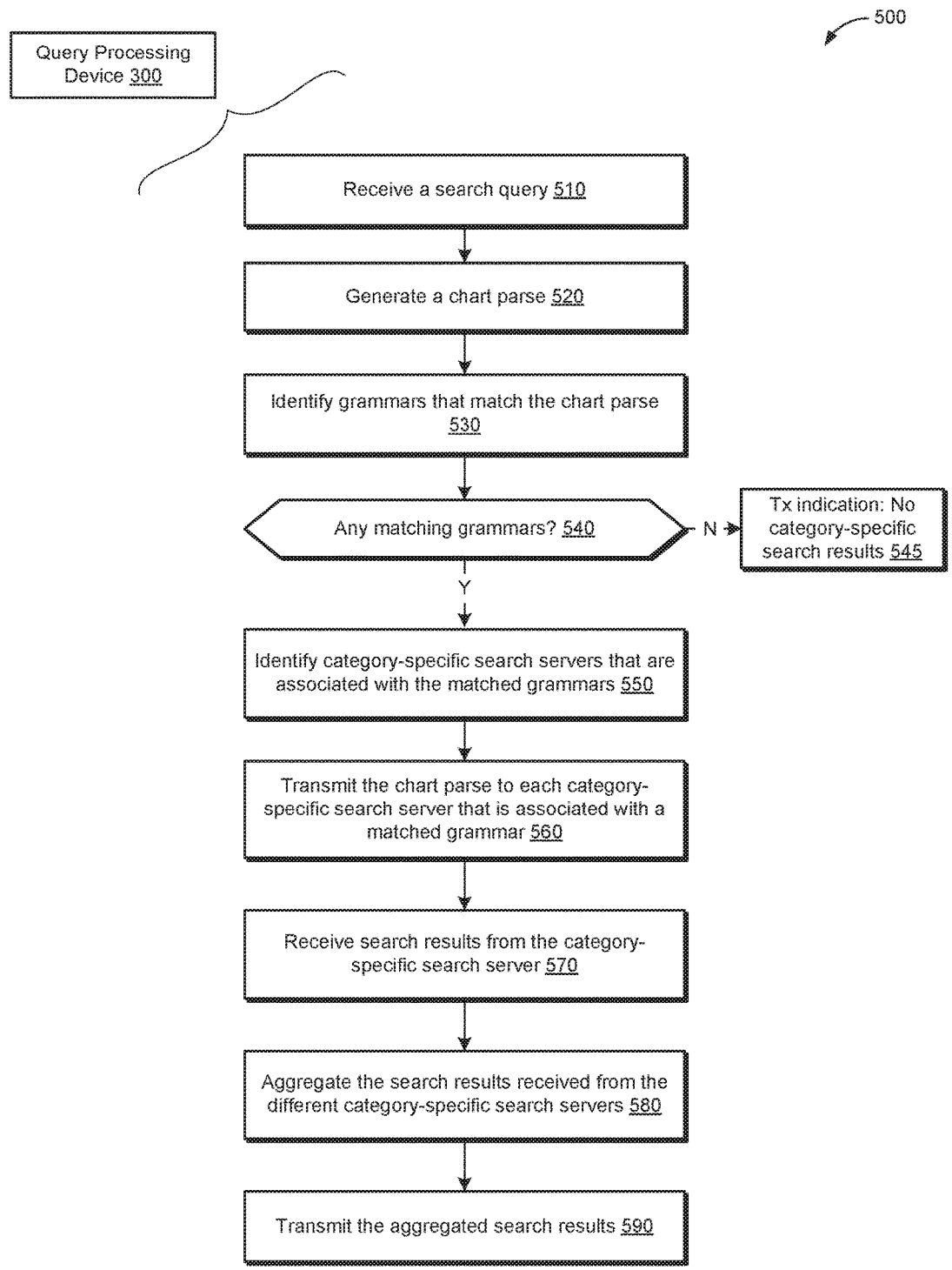
FIG. 5 is a block diagram of an example method that the query processing device may execute.

FIG. 5 illustrates an example method 500 that the query processing device 300 may execute. The query processing device 300 may execute the method 500 as an alternative to executing the method 400 exemplified in FIG. 4. In the example of FIG. 4, the query processing device 300 indicates the category-specific search servers to the general purpose search server, so that the general purpose search server may send the search query or the chart parse to the category-specific search servers. However, in the method 500, the query processing device 300 can send the chart parse or the search query to the category-specific search servers. The operations 510-550 are similar to the operations 410-450, as described in related to FIGS. 4A-C.

At 560, the query processing device 300 transmits the chart parse to each category-specific search server that is associated with a matched grammar. The query processing device 300 may transmit the chart parse to a category-specific search server as part of a request for category-specific search results. The request may include the search query in addition to, or as an alternative to the chart parse. The request may include additional information that the category-specific search servers may utilize to determine the category-specific search results (e.g., a device location, etc.).

At 570, the query processing device 300 receives category-specific search results from the category-specific search servers. If one of the category-specific search servers includes an application search server, then the querying processing device 300 may receive application search results from the application search server. The application search results may include access mechanisms that may allow a user to download software applications from a digital distribution platform. The access mechanisms may also provide direct access to particular functions, and/or particular states of an application.

The query processing device 300 may wait for a predetermined amount of time to receive the category-specific search results from the category-specific search servers. The query processing device 300 may start a timer upon sending requests for category-specific search results to the category-specific search servers. Upon expiration of the timer, if the query processing device 300 does not receive category-specific search results from a particular category-specific search server, then the query processing device 300 may determine that the particular category-specific search server does not have any category-specific search results. The query processing device 300 may utilize different timers for different category-specific search servers. For example, the query processing device 300 may utilize a relatively shorter timer for category-specific search servers that are relatively proximate to the query processing device 300 (e.g., in the same data center). In this example, the query processing device 300 may utilize a relatively long time for category-specific search servers that are relatively distal from the query processing device 300 (e.g., in different continents). In some examples, the query processing device 300 may vary timers based on the amount of data that the category-specific search servers store.

At 580, the query processing device 300 aggregates (e.g., combines) the category-specific search results that the query processing device 300 may receive from different category-specific search servers. Aggregating the category-specific search results may include determining a display order for each category-specific search result. The query processing device 300 can determine a relevance score for each category-specific search result, and order the category-specific search results based on the relevance score. The relevance score for a category-specific search result may include a numerical value that indicates the relevance of that category-specific search result to the search query.

The query processing device 300 can determine the relevance score for a category-specific search result by computing a feature vector for the category-specific search result. The feature vector may include various scoring features. The scoring features may include query scoring features, result scoring features, and/or query-result scoring features. Example query scoring features may include a length of the search query, a popularity of the search query, number of category-specific search servers that the chart parse was sent to, etc. Example result scoring features may include the relevance score specified by the category-specific search server, the rank of the category-specific search result among other category-specific search results from the same category-specific search server, etc. Example query-result scoring features may include the number of terms that are common to the search query and the category-specific search result.

The query processing device 300 can input the feature vector into a machine-learned model that generates the relevance score based on the feature vector. The machine-learned model may include a set of gradient-boosted decision trees. The machine-learned model may be implemented as a set of supervised, semi-supervised, or unsupervised tasks. Other techniques for determining the display order for the category-specific search results are also contemplated.

At 590, the query processing device 300 transmits the aggregated (e.g., combine) search results. The query processing device 300 may transmit the aggregated search results in a data container (e.g., a JSON object, an XML file, etc.). The query processing device 300 may transmit the aggregated search results to the general purpose search server, and/or the mobile computing device.

The general purpose search server 40 and/or the category-specific search servers 60 may include network communication devices (e.g., transceivers) that facilitate electronic communication (e.g., wireless communication such as cellular communication, or wired communication). The general purpose search server 40 and/or the category-specific search servers 60 may include various storage devices. The general purpose search server 40 and/or the category-specific search servers 60 may include a processing device (e.g., one or more computing processors, for example, one or more physical Central Processing Units (pCPUs)) that executes computer-readable instructions. The general purpose search server 40 and/or the category-specific search servers 60 may be implemented by a cloud computing platform.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A search server comprising:
a network communication device;
a storage device that stores a search data store with one or more search records; and
a processing device that executes computer-readable instructions that, when executed by the processing device, cause the processing device to:
receive a search request via the network communication device, the search request comprising a search query with one or more search terms,
send the search query to a query processing device via an application programming interface (API), wherein the query processing device stores a plurality of grammars associated a plurality of category-specific search servers and each of the plurality of grammars specify a set of phrase types and an order of phrase types in the set of phrase types,
upon sending the search query to the query processing device, identify whether an indication is received from the query processing device, wherein the indication indicates that the search query does not trigger category-specific search results and is received from the query processing device when none of the plurality of grammars stored in the query processing device matches the search query, and wherein a specific grammar is identified to match the search query when all of phrase types included in the specific grammar constitutes the search query in an order specified by the specific grammar and the specific grammar spans the search query entirely, and
in response to identifying that the indication has not been received:
transmit the search query to one or more category-specific search server associated with one or more grammar that matches the search query which is identified from the plurality of category-specific search servers,
receive, from the one or more category-specific search server associated with the one or more grammar that matches the search query, the category-specific search results that correspond with the search query,
generate general purpose search results for the search query based on the one or more search records stored in the search data store,
aggregate the category-specific search results and the general purpose search results,
transmit the aggregated search results, and
in response to identifying that the indication has been received:

generate the general purpose search results for the search query based on the one or more search records stored in the data store, and transmit the general purpose search results.

2. The search server of claim 1, wherein receiving the category-specific search results comprises:

initiating a timer; and receiving the category-specific search results before the timer expires.

3. The search server of claim 1, wherein receiving the category-specific search results comprises:

receiving a list of server identifiers (IDs) for category-specific search servers from the query processing device;

sending a request for category-specific search results to each category-specific search server in the list; and receiving the category-specific search results from the category-specific search servers via the network communication device.

4. The search server of claim 1, wherein generating the general purpose search results comprises:

querying the search data store with the search terms of the search query;

identifying a set of search records that are relevant to the search query based on the querying; and retrieving information from the set of search records.

5. The search server of claim 1, wherein aggregating the category-specific search results and the general purpose search results comprises identifying a display order for each category-specific search result and each general purpose search result.

6. The search server of claim 1, wherein the query processing device comprises:

a transceiver;

a memory comprising:

a knowledge data store that stores a list of phrases and phrase types associated with the list of phrases, and grammar files that store grammars, each grammar comprising one or more phrase types, each grammar being associated with one or more category-specific search servers, each category-specific search server being associated with a server identifier (ID); and a computing processor that executes computer-readable instructions that, when executed by the computing processor, cause the computing processor to:

receive the search query from the search server via the API, generate a chart parse for the search query based on the phrase types stored in the knowledge data store, the chart parse identifying the phrase types in the search query and the chart parse indicates a location of the phrase types within the search query, identify whether one or more grammar, from the grammar files, matches the search query based on the phrase types included in the chart parse, in response to identifying that none of the grammars match the search query, transmit, via the transceiver, an indication to the search server that there are no category-specific search results for the search query, and in response to identifying that one or more grammar matches the search query:

identify one or more category-specific search servers that are associated with the one or more grammar that matches the search query, retrieve, from the grammar files, the server IDs for the one or more category-specific search servers that are associated with the one or more grammar that matches the search query, generate a list of server IDs for the one or more category-specific search servers that are associated with the one or more grammar that matches the search query, and transmit, via the transceiver, the list of server IDs to the search server.

7. The search server of claim 6, wherein generating the chart parse comprises:

generating tokens by splitting the search query with a given delimiter;

forming n-grams by concatenating adjacent tokens;

querying the knowledge data store with the n-grams;

receiving the phrase types associated with the n-grams; and generating a mapping between the phrase types and token positions that indicate the location of the phrase types within the search query.

8. The search server of claim 7, wherein the chart parse maps token start positions and token end positions to the phrase types that span from the token start positions to the token end positions.

9. The search server of claim 6, wherein identifying whether the one or more grammars match the search query comprises:

identifying a set of phrase types, in the chart parse, that collectively reference all the one or more search terms of the search query;

querying the grammar files with the set of phrase types; and receiving an indication that indicates whether the grammar files include a grammar that defines all the phrase types in the set.

10. The search server of claim 6, wherein the computer-readable instructions further cause the computing processor to:

transmit the chart parse to each category-specific search server that is associated with a matched grammar;

receive category-specific search results from the category-specific search servers;

aggregate the category-specific search results received from the category-specific search servers; and transmit the aggregated category-specific search results to the search server.

11. A query processing device for processing a search query, the query processing device comprising:

a transceiver;

a memory comprising:

a knowledge data store that stores a list of phrases and phrase types associated with the phrases, and grammar files that store a plurality of grammars, each grammar comprising one or more phrase types, the plurality of grammars being associated with a plurality of category-specific search servers, each category-specific search server being associated with a server identifier (ID), and each of the plurality of grammars specifying a set of phrase types and an order of phrase types in the set of phrase types; and a computing processor that executes computer-readable instructions that, when executed by the computing processor, cause the computing processor to:

receive the search query via an application programming interface (API) request, the search query comprises one or more search terms;

generate a chart parse for the search query based on the phrase types stored in the knowledge data store, the chart parse identifying the phrase types in the search query and the chart parse indicates a location of the phrase types within the search query;

identify whether one or more grammar, from the grammar files, matches the search query based on the phrase types included in the chart parse, wherein a specific grammar is identified as matching the search query when all of phrase types included in the specific grammar constitutes the search query in an order specified by the specific grammar and the specific grammar spans the search query entirely;

in response to identifying that none of the grammars match the search query, transmit, via the transceiver, an indication that there are no category-specific search results for the search query; and in response to identifying that one or more grammar matches the search query:

identify one or more category-specific search server associated with the one or more grammar that matches the search query, from the plurality of category-specific search servers;

retrieve, from the grammar files, server IDs for the one or more category-specific search server associated with the one or more grammar that matches the search query;

generate a list of the server IDs for the one or more category-specific search server associated with the one or more grammar that matches the search query; and transmit the list of the server IDs via the transceiver.

12. The query processing device of claim 11, wherein generating the chart parse comprises:

generating tokens by splitting the search query with a given delimiter;

forming n-grams by concatenating adjacent tokens;

querying the knowledge data store with the n-grams;

receiving the phrase types associated with the n-grams; and generating a mapping between the phrase types and token positions that indicate the location of the phrase types within the search query.

13. The query processing device of claim 12, wherein querying the knowledge data store comprises querying an inverted index that maps phrases to phrase types that are associated with the phrases.

14. The query processing device of claim 12, wherein the chart parse maps token start positions and token end positions to the phrase types that span from the token start positions to the token end positions.

15. The query processing device of claim 14, wherein generating the chart parse further comprises generating an augmented inverse chart parse that maps phrase types and respective token start positions to respective token end positions.

16. The query processing device of claim 11, wherein identifying whether the one or more grammars match the search query comprises:

identifying the set of phrase types, in the chart parse, that collectively reference all the search terms of the search query;

querying the grammar files with the set of phrase types; and receiving an indication that indicates whether the grammar files include a grammar that defines all the phrase types in the set.

17. The query processing device of claim 16, wherein querying the grammar files comprises querying an index that maps phrase types to the grammars that include the phrase types.

18. The query processing device of claim 16, wherein receiving the indication comprises receiving a binary value that indicates whether the set of phrase types match one of the stored grammars.

19. The query processing device of claim 11, wherein the computer-readable instructions further cause the computing processor to:

transmit the chart parse to each category-specific search server that is associated with a matched grammar;

receive category-specific search results from the category-specific search servers;

aggregate the category-specific search results received from the category-specific search servers; and transmit the aggregated category-specific search results via the transceiver.

20. A computer-implemented method comprising:

storing, in a memory of a query processing device, a knowledge data store that stores a list of phrases and phrase types associated with the phrases;

storing, in the memory, grammar files that store a plurality of grammars, each grammar comprising one or more phrase types, the plurality of grammars being associated a plurality of category-specific search servers, each category-specific search server being associated with a server identifier (ID), and each of the plurality of grammars specifying a set of phrase types and an order of phrase types in the set of phrase types;

receiving, at a computing processor of the query processing device, a search query via an application programming interface (API) request, the search query comprising one or more search terms;

generating, at the computing processor, a chart parse for the search query based on the phrase types stored in the knowledge data store, the chart parse identifying the phrase types in the search query and the chart parse indicates a location of the phrase types within the search query;

identifying, at the computing processor, whether one or more grammar, from the grammar files, matches the search query based on the phrase types included in the chart parse, wherein a specific grammar is identified as matching the search query when all of phrase types included in the specific grammar constitutes the search query in an order specified by the specific grammar and the specific grammar spans the search query entirely;

in response to identifying that none of the grammars match the search query, transmitting, via a transceiver, an indication that there are no category-specific search results for the search query; and in response to identifying that one or more grammar matches the search query:

identifying, by the computing processor, one or more category-specific search server associated with one or more grammar that matches the search query, from the plurality of category-specific search servers;

retrieving, from the grammar files, the server IDs for the one or more category-specific search server associated with the one or more grammar that matches the search query;

generating, at the computing processor, a list of the server IDs for the one or more category-specific search server associated with the one or more grammar that matches the search query; and transmitting, via the transceiver of the query processing device, the list of the server IDs to a search server.

21. The computer-implemented method of claim 20, wherein generating the chart parse comprises:

generating tokens by splitting the search query with a given delimiter;

forming n-grams by concatenating adjacent tokens;

querying the knowledge data store with the n-grams;

receiving the phrase types associated with the n-grams; and generating a mapping between the phrase types and token positions that indicate the location of the phrase types within the search query.

22. The computer-implemented method of claim 20, wherein identifying whether the one or more grammars match the search query comprises:

identifying the set of phrase types, in the chart parse, that collectively reference all the search terms of the search query;

querying the grammar files with the set of phrase types; and receiving an indication that indicates whether the grammar files include a grammar that defines all the phrase types in the set.

23. The computer-implemented method of claim 20, further comprising:

transmitting the chart parse to each category-specific search server that is associated with a matched grammar;

receiving category-specific search results from the category-specific search servers;

aggregating the category-specific search results received from the different category-specific search servers; and transmitting the aggregated category-specific search results via the transceiver.

* * * * *